(12) United States Patent
Iwen et al.

(10) Patent No.: US 6,355,323 B1
(45) Date of Patent: Mar. 12, 2002

(54) MASKING BARRIERS

(76) Inventors: Matthew L. Iwen, 13901 Maryland Ave., Savage, MN (US) 55378; Robert A. Christopherson, 16470 Fernando Way, Rosemont, MN (US) 55068; Don Kiser, 16570 Harwell Ave., Lakeville, MN (US) 55044; Thomas J. Lundborg, 151 S. Cedar, Belle Plaine, MN (US) 56011

( * ) Notice: Subject to any disclaimer, the term of this patent is extended or adjusted under 35 U.S.C. 154(b) by 0 days.

(21) Appl. No.: 09/491,756

(22) Filed: Jan. 27, 2000

Related U.S. Application Data
(60) Provisional application No. 60/117,582, filed on Jan. 27, 1999.

(51) Int. Cl.[7] .................................................. B32B 3/04
(52) U.S. Cl. ..................... 428/41.8; 428/192; 156/71; 156/227; 156/291; 427/282; 52/411; 52/506.01; 52/750
(58) Field of Search .......................... 156/71, 227, 291; 427/282; 118/505; 428/40.1, 41.8, 192, 194; 52/408, 411, 412, 506.01, 750

(56) References Cited

U.S. PATENT DOCUMENTS

| | | | |
|---|---|---|---|
| RE19,128 E | | 4/1934 | Drew |
| 2,210,233 A | | 8/1940 | Lillo |
| 2,618,333 A | | 11/1952 | Judd |
| 2,749,262 A | * | 6/1956 | Wiser |
| 3,017,020 A | * | 1/1962 | Giles et al. |
| 4,263,347 A | | 4/1981 | Banta |
| 4,889,759 A | | 12/1989 | Yamazaki |
| 5,328,729 A | | 7/1994 | Lamonte, Jr. |
| 5,356,503 A | | 10/1994 | Caryford et al. |
| 5,364,677 A | | 11/1994 | Sendziak |
| 5,407,716 A | | 4/1995 | Mitchell |
| 5,413,637 A | | 5/1995 | Bastow |
| 5,569,228 A | * | 10/1996 | Byrd et al. |
| 5,640,827 A | | 6/1997 | Van Someren et al. |

OTHER PUBLICATIONS

Scotch™ Brand T–627–2 Flat Surface Tape Applicator manufactured for 3M Corporation (by Straub Design Company (Minneapolis, MN).

* cited by examiner

*Primary Examiner*—Sam Chuan Yao
(74) *Attorney, Agent, or Firm*—Alston & Bird LLP

(57) ABSTRACT

A barrier sheet having a first side and a second side, a top edge, a bottom edge, and a laterally located midpoint, wherein the sheet is folded along its length to form a folded sheet defined by at least one fold with an adhesive strip positioned at a predetermined distance from the top and bottom edges, and preferably approximately at the sheet midpoint. When making a roll of barrier material, a barrier sheet material is provided and folded at least once laterally. The sheet then incorporates an adhesive strip applied to one side of the sheet at a predetermined distance from the top and bottom ends, preferably approximately at the midpoint. The adhesive strip is oriented lengthwise such that when the sheet is unrolled from the roll and unfolded, the strip will approximately bisect the sheet lengthwise. The sheet is then folded in a predetermined fashion, and rolled onto a roll. Further, when applying the barrier material to a structure, a predetermined length of folded sheet is extended and cut from the roll. The free, but still folded sheet is affixed to the structure by removing a backing material from the adhesive strip and pressing the product against the structure. The sheet can then be unfolded to form a 2-ply barrier.

13 Claims, 4 Drawing Sheets

MASKING BARRIERS

CROSS-REFERENCE TO RELATED APPLICATIONS

This application claims the benefit of U.S. Provisional Application No. 60/117,582, filed Jan. 27, 1999.

BACKGROUND OF THE INVENTION

The present invention relates to masking surface areas prior to removing harmful or detrimental materials from adjacent surfaces. More particularly the invention is related to devices used to mask walls in a room prior to removing dust, debris, paint, plaster, insulation or other more toxic substances such as asbestos fibers during asbestos abatement projects.

The process of asbestos abatement requires the careful, thorough and complete encapsulation of all room surfaces prior to the asbestos removal. In the past, the masking has been time consuming and awkward. The current method according to accepted standards is to hang a sheet of film, typically twelve feet wide, from the wall being covered. The sheet is secured with duct tape, spray adhesive and staples. The process is then repeated resulting in two layers of protective masking covering the walls.

A plastic film ordinarily is used as the masking material. The film covers the walls and floor of a room from whose ceiling the asbestos is usually scraped. Normal wall heights are approximately from about 7 to about 9 feet. The typical width of the available plastic film is 10 feet. The plastic sheets are generally folded many times upon a roll to facilitate shipping, handling and storage. The rolls therefore have widths less than the width of the unrolled and unfolded sheet. A variety of fold patterns may be used to fold a 10 or 20 feet wide sheet into a 3 feet wide roll.

The application of the plastic film remains a tedious operation. First, the worker unrolls and, if necessary, cuts the film from the roll to a dimension somewhat longer than the perimeter of the room being encapsulated. Without unfolding the detached length, the worker positions the plastic and affixes it at the highest point of the wall using a combination of spray, adhesive tape and staples, if possible. The material is then unfolded and extended completely to the floor where it is also secured using the adhesives and tape. The entire process is then repeated by the worker, using a second roll of material with the end result being two individual layers of barrier film attached to the wall surface. Extreme care must be taken in this phase to insure that there are no gaps left between the tape and the upper edge of the masked sheet which would later allow the removed asbestos to contaminate wall surfaces.

According to the known methods outlined above, three or more workers are required to simultaneously attach the masking material, and apply the spray, tape and staples along the wall. Such masking barrier application methods are time consuming and expensive. Methods and apparatuses are known in the art that provide plastic sheets incorporating a strip of adhesive at one end of the sheet. See U.S. Pat. Nos. 4,263,347; Re 19,128; 5,640,827 and 5,328,729. However, none of the known methods and apparatuses for applying a barrier film allows for the easy and efficient installation of a multiple ply barrier film.

SUMMARY OF THE INVENTION

According to one embodiment, the present invention is directed to a specially made barrier material and a method for making a roll of barrier material. Barrier sheet material is provided with the material folded at least once laterally. The barrier sheet has first and second sides, top and bottom ends, and a pair of sides. The sheet further has a laterally extending midpoint. The sheet incorporates an adhesive strip applied to at least one side of the sheet at a predetermined distance from the top and bottom ends, preferably approximately at the midpoint. The sheet is then folded in a predetermined fashion, and rolled onto a roll. Preferably, the adhesive strip is applied after the film has been folded in a predetermined fashion, and just prior to the winding of the folded sheet onto the roll. The adhesive strip preferably is oriented near the lengthwise midpoint of the roll, and the sheet is folded multiply. The adhesive strip is oriented such that when the sheet is unrolled from the roll and unfolded, the strip will approximately bisect the sheet in the lengthwise direction.

According to a further embodiment, the present invention provides a method of applying a barrier material to a structure. A roll of barrier material is provided. The rolled material has an elongated sheet having a first side and a second side, and a top end and a bottom end, and a laterally located midpoint. Preferably, the sheet is folded along its length to form a folded sheet defined by at least one fold with an adhesive strip positioned at a predetermined distance from the top and bottom ends, preferably approximately at the lengthwise midpoint of the sheet. A predetermined length of folded sheet is extended and cut from the roll. The free, but still folded sheet is affixed to the structure by removing a backing material from the adhesive strip and pressing the product against the structure.

In a still further embodiment, the present invention provides a barrier sheet having a first side and a second side, and a top edge and a bottom edge. Further, the sheet has a midpoint located lengthwise along the sheet, approximately bisecting the sheet lengthwise. The sheet is folded along its length to form a folded sheet defined by at least one fold with at least one adhesive strip positioned at a predetermined distance from the top and bottom edges, and preferably approximately at the sheet's lengthwise midpoint.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
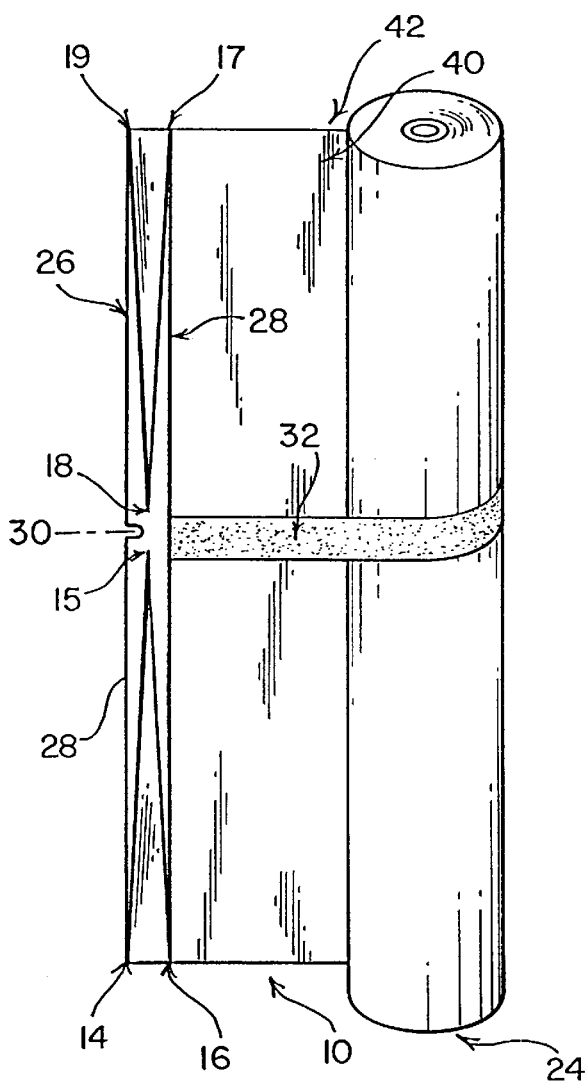
FIG. 1a is a perspective view of a roll of sheet material folded and pretaped at a lengthwise midpoint.
Figure 1B:
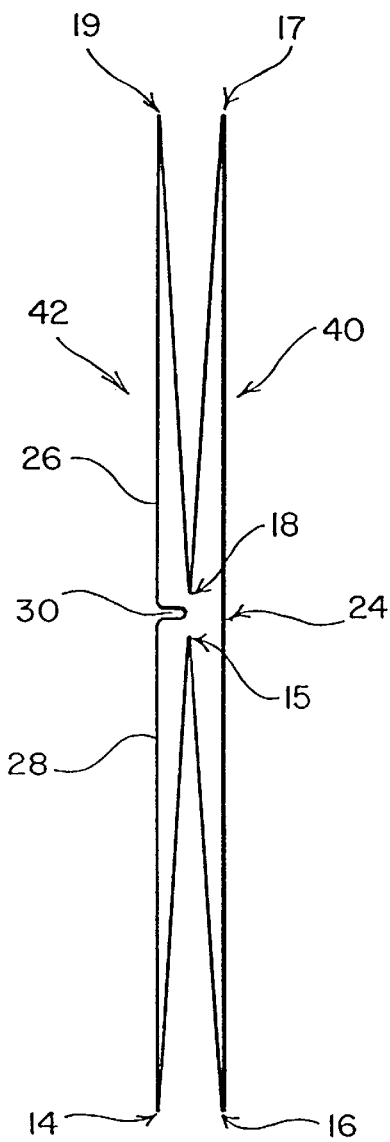
FIG. 1b is a side view of the folded sheet showing the folds.

As shown in FIGS. 1a and 1b, sheet 10 is folded at folds 14, 15, 16, 17, 18 and 19 onto roll 24. Ends 26 and 28 of sheet 10 meet at point 30. Adhesive strip 32 is shown applied to surface 40 of roll 24. A release paper (not shown) may cover adhesive strip 32.

Figure 2:
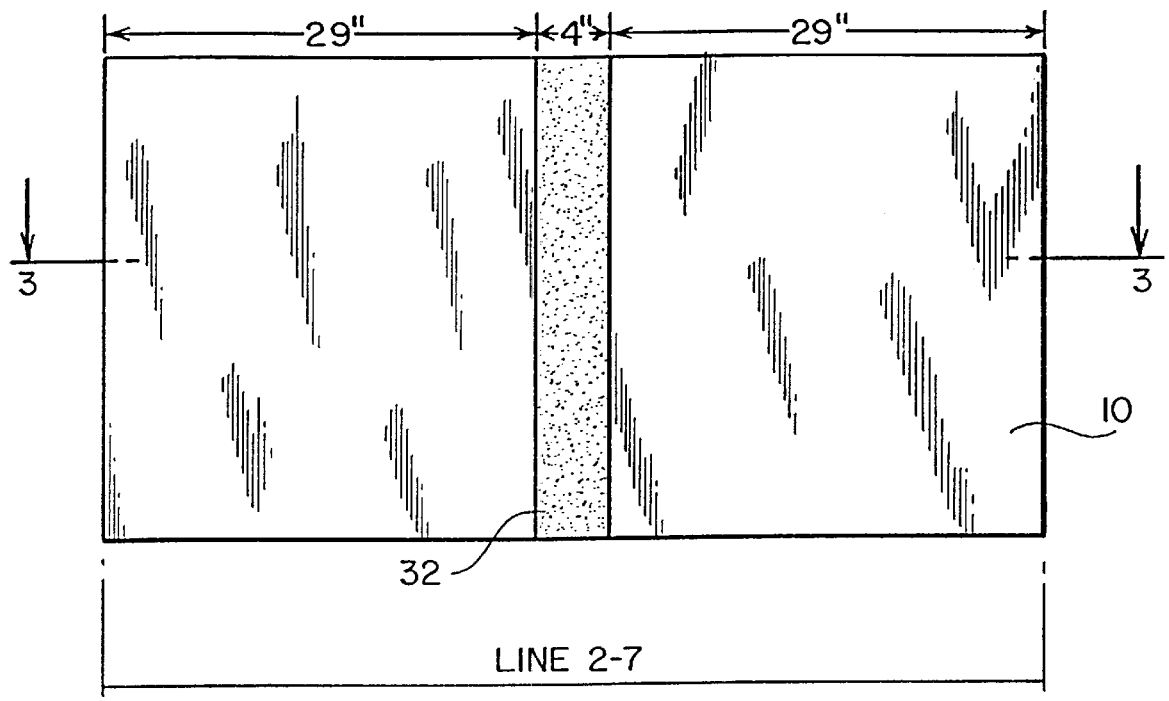
FIG. 2 is an enlarged plan view of the sheet.

FIG. 2 shows an enlarged view of sheet 10 having strip 32 applied.

Figure 3:
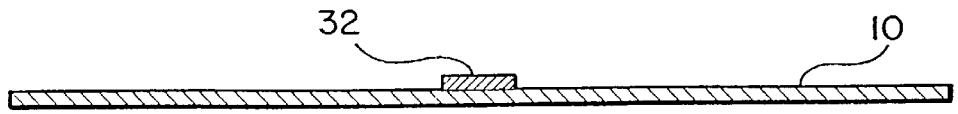
FIG. 3 is a cross-sectional view of the sheet of FIG. 2 viewed across line 3—3.

FIG. 3 shows a cross-sectional view of sheet 10 across line 3—3.

Figure 4:
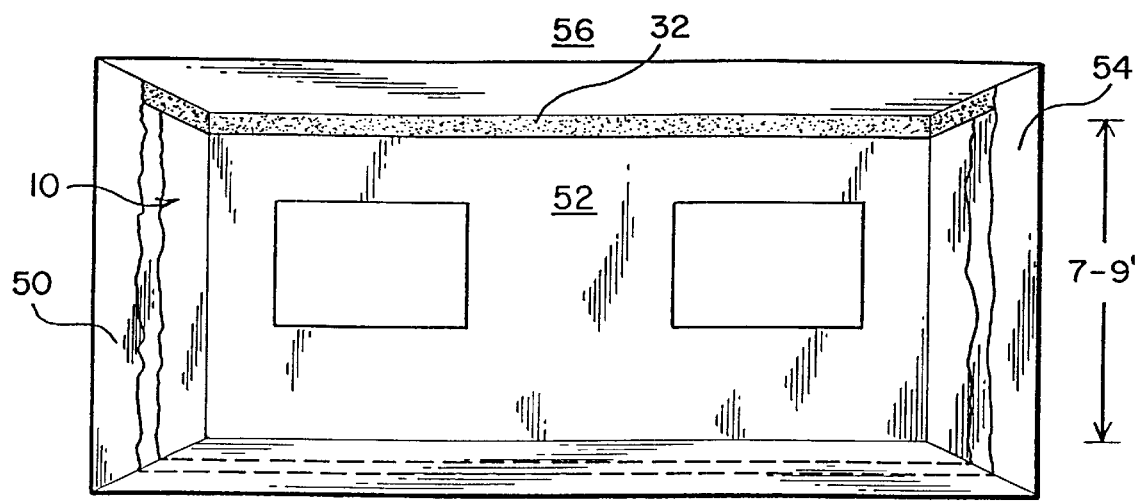
FIG. 4 is a perspective view of the sheet of FIG. 1 in the final installed position.

FIG. 4 shows the unrolled sheet 10 of FIG. 1 unrolled in a fully unfolded orientation and affixed in a barrier configuration. The adhesive strip 32 of sheet 10 is shown in its affixed position along the top of wall 50, 52, 54 of room 56.

In operation, the sheet is unrolled from the roll to a desired length. The sheet is then cut longitudinally from the roll. The worker then removes the release paper from the adhesive strip. Grasping the sheet adjacent the strip, the worker then lifts the sheet into position and affixes the sheet's strip (and the sheet) to the structure; usually a wall or a ceiling. As the sheet is lifted into position and affixed to the structure, it unfolds or undrapes, preferably on both sides of the strip. In the fully unfolded and adhered position, the sheet becomes a 2-ply barrier as shown in FIG. 4.

For purposes of the present invention, it is understood that the term "midpoint" refers to the area of a sheet on a roll occurring lengthwise at a point approximately halfway between the two (top and bottom) ends of the roll. If the overall sheet has been evenly folded above and below the midpoint, the midpoint would occur both at about the middle of the roll and at about the middle of the overall sheet. However, it is understood that if, for example, only one fold occurs above the midpoint of the roll, but multiple folds occur below the midpoint of the roll, it is possible that the midpoint of the roll would not coincide with the midpoint of the sheet. It is also understood that one or more than one adhesive strip can be positioned anywhere lengthwise or otherwise on one or both sides of the sheet as desired. The strip is positioned at predetermined distances from the top and bottom edges of the sheet to effect a 2-ply barrier when the sheet is affixed to a structure and the sheet unfolds to its fully extended length.

For purposes of asbestos remediation and wherever a two-ply application is desired, it is most efficient to have the unfolded area of the sheet above the midpoint approximately equal the unfolded area below the midpoint of the sheet. In other words, it is desirable for the midpoint of the sheet to coincide with the midpoint of the roll. In this way, a user may simply unroll material from the roll, remove the release paper from the adhesive strip (if present), and lift the sheet and place the exposed adhesive against the surface to be masked. At this point, the barrier sheet extending from both sides of the midpoint will drape downward creating equal areas of sheet on either side of the adhesive strip. With the midpoint affixed to a ceiling or wall, the ends of both sheet sides will then extend to approximately the same point on a wall or floor. At this point, the worker has applied a two-ply barrier sheet to an upper surface of a wall or ceiling and is now free to seal the sides and ends to the walls and floor of the room. It is understood that the sheet can be folded in a configuration such that the ends of both sheet sides extend to approximately the same point, but due to unequal folding on the roll, the adhesive strip does not occur at the lengthwise midpoint of the roll.

In one preferred embodiment, it is contemplated that the sheet may have additional adhesive areas, optionally covered with a release paper. For example, such additional adhesive strips could occur at the side ends or top and bottom edges of the side sheet. Such additional adhesive strips would allow a worker to expose the adhesive strips and then seal the sheet ends either together or to the structure being masked (i.e. the wall or the floor).

The sheet material may be any approved material useful for the job desired. In other words, where a particular material is required to comply with federal or state regulations, such material may be adapted according to the present invention. Therefore, the sheet material may be any polymeric or non-polymeric film, but is preferably polyolefin. The sheet material may also include a flame retardant component, or other agent. Other agents may include, but are not limited to additives with antistatic, ultraviolet, talc, fillers, pigments, and corrosion inhibiting properties.

The present invention contemplates the film sheet may be of any useful thickness. However, when the rolled barrier material is used for asbestos remediation, the useful thickness of the preferred polymeric film will be from about 1 to about 10 mils, preferably from about 4 to about 6 mils.

The adhesive strip is applied to the desired location of the material on the roll according to any useful process. The adhesive may be applied continuously or non-continuously on a web. Any adhesive may be used. However, adhesives that adhere well, but do not damage the coatings on the structures to which they are adhered are most desirable. For specific jobs such as asbestos remediation, regulations may require that a film is held in place and is impervious to asbestos fiber for a period of from about one day to about 30 days (depending upon the local or Federal regulation). Therefore, the adhesive chosen will be a function of the desired cling time relative to the overall weight of the sheet material. The preferred adhesives include acrylic, waterbase solvent, and copolymeric adhesives, with copolymeric adhesives being most preferred.

An example of a preferred copolymeric adhesive is ITC Adhesive #PS-33, manufactured by International Tape Company (Windham, N.H.). ITC Adhesive #PS-33 is a permanent thermoplastic comprising a styrene block copolymer, an aliphatic hydrocarbon tackifier, antioxidants, stabilizers and titanium dioxide. This adhesive system, applied to a scrim cloth or paper carrier, exhibits quick stick and excellent holding power to both smooth and rough surfaces. The #PS-33 adhesive is capable of migrating into porous surfaces, thus making it suitable for adhesion to cement, wallboard, cinder block building materials and the like.

The adhesive selected may or may not require the use of a release film to protect the adhesive. It is possible that the film or barrier itself may possess qualities, which allows the adhesive to stick only to itself and/or the desired substrate, but not to the barrier material. However, the present invention also contemplates the use of a release strip to cover the adhesive and allow for rolling upon itself. The release strip may then be easily removed exposing the adhesive as the unrolled material is ready for use. The preferred materials comprising the release strip include paper, polyester film, polyethylene film, polypropylene film, tissue and synthetic carrier, with paper being most preferred. The overall sheet material is longitudinally rolled and folded according to known methods.

Figure 5:
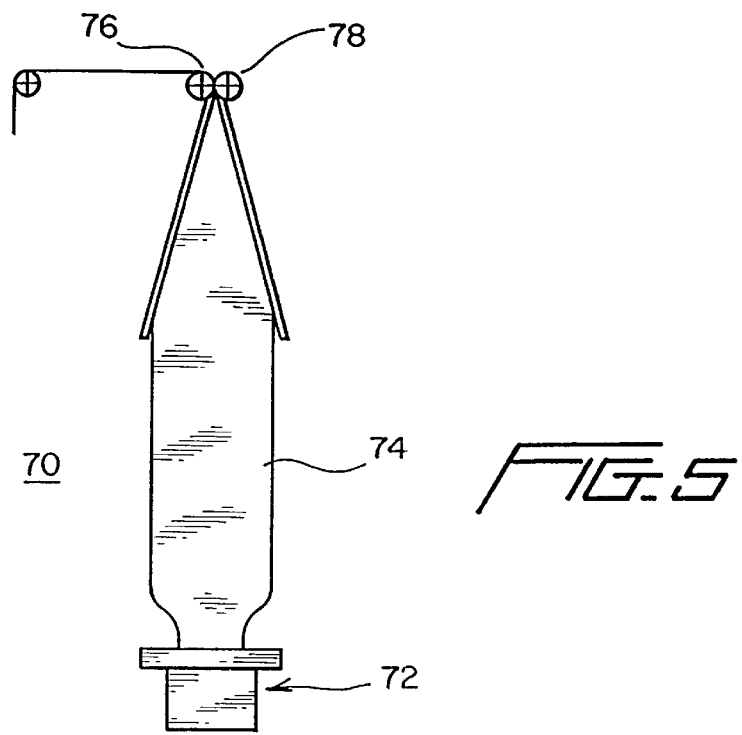
FIG. 5 is a perspective view of the initial collapsing, or inward contraction of the bubble to create a permanent indentation prior to lateral folding.

Preferably, the film of the present invention is made via blown film extrusion. As shown in FIG. 5, this is a process by which lengths of constant cross section are formed by forcing a molten material (e.g. a molten polymeric material) through a die 72 and an orifice-containing element mounted at the delivery end of an extruder (not shown) that shapes the extrudate. The extrudate in its emergent shape is circular in nature, and after being pinched together, air is inserted forming a tubular or "bubble" configuration. After the formation of the "bubble," it is pulled up the extrusion tower by a set of pull nips, 76, 78. The initial forming of the product begins in the tower with a process referred to as collapsing. Collapsing is the inward contraction of the walls of the "bubble" (e.g. while cooling), resulting in permanent indentation.

Figure 7:
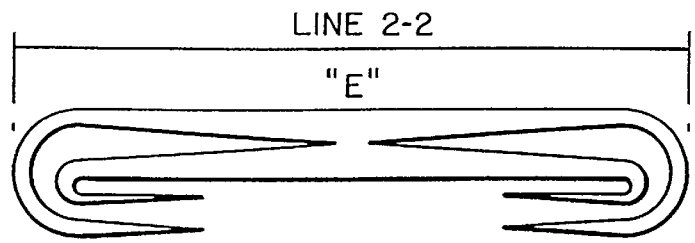
FIG. 7 is a perspective view of the sheet after being initially collapsed and laterally folded as viewed across line 2—2.
Figure 6:
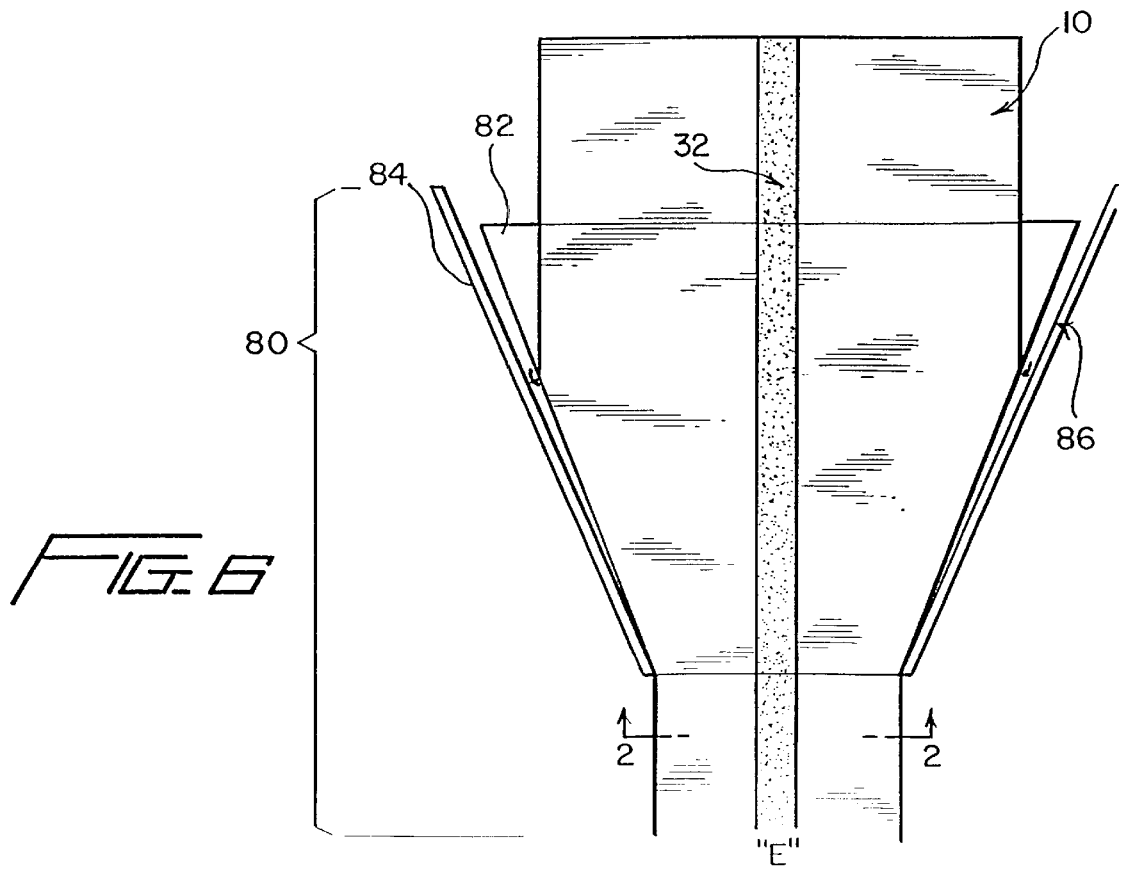
FIG. 6 is a perspective view of the sheet of FIG. 3 entering the folding process.

This collapsed "bubble" is further modified by being laterally folded (gussetted) along its length to form a folded sheet. As shown in FIG. 5, the transverse cross-section is indicated. This gusset fold is a tuck in the side of the bubble "parallel" to the initial collapsed surface. This allows the film to assume a nearly rectangular or box-like form when opened. The gussets are formed in tubular blown film just before the film enters the pull nips. Immediately passing through the pull nips, a 20 foot circumferential tube would have the approximate measurements, as shown in FIG. 2, after the collapsing and gussetting processes. For easier handling, transport and storage by the end user, a further width reduction is required. This is accomplished by folding the film on a folder 80 as shown in FIG. 6. The film initially passes over a large triangular metal platform 82 and part of the film facial surface 10 is guided around the folder 80 by one or more guide bars 84, 86 thus reducing the overall width of the web surface from about, for example, 62" to about 38" (as shown in FIG. 7). The adhesive tape is then added to this smaller web dimension at the point marked "E" in FIG. 7. After folding, and prior to applying the adhesive tape, a lengthwise slit is formed in the web opposite the point marked "E" in FIG. 7 to form a lengthwise bisection of the sheet 10 at point 30 on FIG. 1b.

The adhesive tape is applied to the film using any appropriate tape application system, such as a Scotch# Brand T-627-2 Flat Surface Tape Applicator manufactured for 3M Corporation (Minneapolis, Minn.) by Straub Design Company (Minneapolis, Minn.), to obtain the finished product as shown in FIG. 1. The T-627-2 Tape Applicator features multiple taping heads with "low roll" sensors and a custom control system. The control system is capable of switching the taping applicator from a taping head having an expiring taping supply to another taping head having a new taping supply to provide a continuous taping operation. The preferred applicator may further have an encoder to feed back information to the controller regarding the length of the web to which taping has been applied in order to efficiently coordinate switchover from one tape head to another.

Preferably, the tape is first conveyed to a taping position under the tape head. A discrete product activates a sensor which lowers a laminating wheel and starts the tape application process. When the desired length of tape has been applied to the product, a tape cut-off sensor is activated by the product which then retracts the laminating wheel from the product. A knife then cuts the tape. The process is repeated when the next discrete product activates the laminating wheel lowering sensor. However, it is understood that, in the case of the present invention where the product comprises a sheet of extended length, the tape cut-off sensor may be deactivated or adjusted accordingly to provide continuous taping along the entire length of the sheet.

With regard to the adhesive, it is further contemplated that a double-faced cloth tape may be applied to the sheet and for a 2-ply application, preferably at or near the midpoint. Such preferred cloth tape includes #219 containing ITC Adhesive #PS-33 and #319 containing ITC Adhesive #PS-33, both manufactured by International Tape Company, (Windham, NH), with the #219 cloth tape being most preferred.

Figure 8:
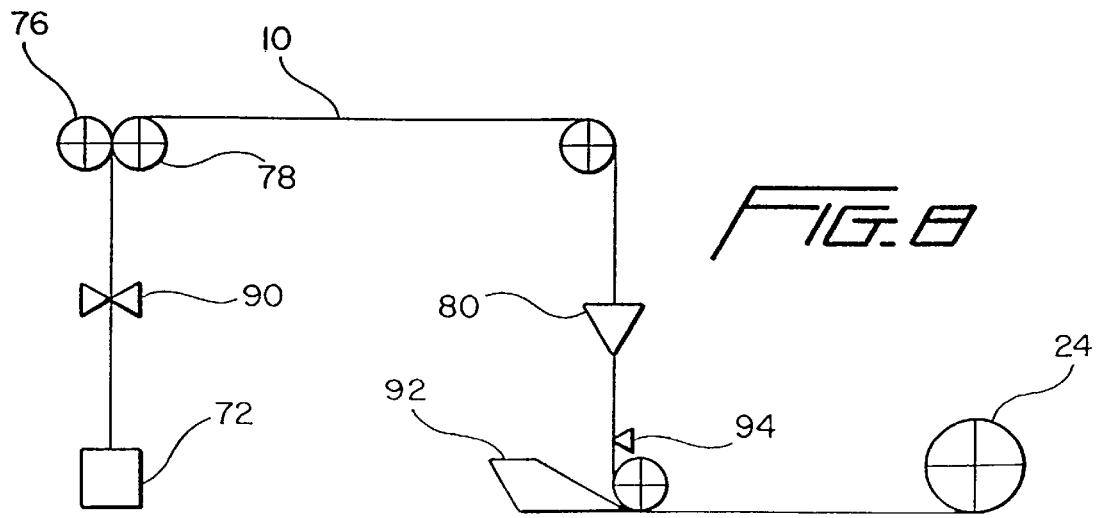
FIG. 8 is a block diagram of the production process for a roll of sheet material folded and pretaped at a lengthwise midpoint.

FIG. 8 is a block diagram representation of a production process for a roll of sheet material laterally folded and pretaped at a midpoint. The molten polymeric material comprising the film 10 is forced through die 72 of the extruder (not shown) to form the "bubble" configuration of the extrudate. The "bubble" is then pulled up the pull tower by pull nips 76 and 78. Between the die 72 and the pull nips 76 and 78, the "bubble" is collapsed and is gussetted by a gusset folding device 90. Once the sheet has been formed and gussetted, it is then reduced in width by folder 80. The adhesive tape is then applied to the reduced dimension sheet by the tape application system 92. Just prior to the tape being applied, the lengthwise slit is formed in the product by a cutting device 94 to produce a lengthwise bisection of the sheet 10 at point 30 as shown in FIG. 1A and 1B. The finished product is then rolled onto roll 24. Tape placement may also be accomplished at any point after 78 of FIG. 8. Tape placement may also occur after the product is wound on the core, such as upon unrolling the film from the roll at the end user's job site. The adhesive tape may be exposed to corona discharge treatment process, to increase the adhesion potential of the adhesive strip, and may be printed on with a water-based or solvent-based ink.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A barrier sheet comprising:

an elongated sheet having a first side and a second side, a top edge and a bottom edge, said sheet having a laterally located midpoint, said sheet folded along its length thereof to form a folded sheet defined by at least three folds above and at least three folds below the midpoint along its length; and an adhesive strip positioned at approximately the midpoint between the top edge and the bottom edge.

2. The sheet according to claim 1, wherein the sheet is rolled.

3. The sheet according to claim 1, wherein the adhesive strip comprises an adhesive selected from the group consisting of acrylic adhesives, water-based adhesives, solvent-based adhesives, and copolymeric-based adhesives, and hot-melt adhesives.

4. The sheet according to claim 1, wherein the adhesive strip is covered by a release paper.

5. The sheet according to claim 2, wherein the predetermined lengths are rolled.

6. The sheet according to claim 1, wherein the sheet is made from a polymeric film.

7. The sheet according to claim 1, wherein the sheet is made of a non-polymeric film.

8. The sheet according to claim 1, wherein the sheet is made of polyolefin.

9. The sheet according to claim 1, wherein the sheet further comprises a flame retardant material.

10. The sheet according to claim 1, wherein the barrier sheet has a first end above the midpoint and a second end below the midpoint, the sheet folded such that the first and second ends approximately meet at the second side of the sheet near the midpoint.

11. The sheet according to claim 1, wherein the top and bottom edges comprise an adhesive strip.

12. The sheet according to claim 1, wherein the sheet has a periphery and the periphery comprises an adhesive strip.

13. The sheet according to claim 1, wherein the sheet is exposed to corona discharge treatment process.

\* \* \* \* \*